United States Patent Office 3,260,748
Patented July 12, 1966

3,260,748
S-(4-VINYLBENZYL)-ISOTHIOUREA AND
ISOTHIOURONIUM CHLORIDE
Samuel J. Nelson, Jr., Grosse Pointe, Mich., assignor to
United States Rubber Company, New York, N.Y., a
corporation of New Jersey
No Drawing. Filed Mar. 6, 1963, Ser. No. 263,110
3 Claims. (Cl. 260—564)

This invention relates to new chemicals.
A new chemical of the present invention is S-(4-vinylbenzyl)isothiouronium chloride which may be represented by the formula

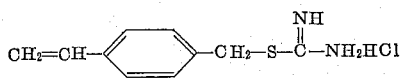

It is made by reacting the known 4-(chloromethyl)styrene (see Clark et al. U.S. Patent No. 2,780,604) with thiourea. It is a fungicide, and is an intermediate for making 4-(mercaptomethyl)styrene, which may be represented by the formula

The 4-(mercaptomethyl)styrene is made by first neutralizing the hydrochloride of S-(4-vinylbenzyl)isothiouronium chloride in aqueous solution with ammonia to precipitate S-(4-vinylbenzyl)isothiourea, also a new chemical, which is filtered and dried. The 4-(mercaptomethyl)styrene distills from S-(4-vinylbenzyl)isothiourea on heating under vacuum. The 4-(mercaptomethyl)styrene may be homopolymerized in emulsion with a free-radical producing catalyst to produce a new polymer, viz., poly-[4-(mercaptomethyl)styrene]. It may be used to prepare new copolymers by copolymerizing it in minor proportion, generally up to 20% of the monomer mixture, with a major proportion of monomeric material selected from the group consisting of styrene, acrylonitrile, vinyl acetate, alkyl esters of acrylic acid having 1 to 12 carbon atoms in said alkyl radical, and alkyl esters of methacrylic acid having 1 to 12 carbon atoms in said alkyl radical, to increase the branching of the polymers of said monomeric materials and thus improve their processibility. Also, at equivalent molecular weights, branched polymers give solutions of lower viscosity than linear polymers; this permits higher concentrations of such branched polymers at the same viscosity. Examples of the alkyl esters of acrylic and methacrylic acids are methyl acrylate, methyl methacrylate, butyl acrylate, lauryl methacrylate.

The following examples illustrate the invention. All parts and percentages are by weight.

Example 1

This example illustrates the preparation of S-(4-vinylbenzyl)isothiouronium chloride.

A one-liter Erlenmeyer flask is charged with 91.8 g. (0.602 mole) of 4-(chloromethyl)styrene, 48.0 g. (0.63 mole) of thiourea, 1.2 g. of tertbutylcatechol, and 180 ml. of methanol. Frequently, a small amount of polymer precipitates upon the addition of methanol, and is removed by the addition of charcoal and filtration. The flask is stoppered and placed in the oven over night at 47° C. The flask is then cooled, and the desired S-(4-vinylbenzyl)isothiouronium chloride is precipitated with ether. The yield is 126 grams, or 92% of theory. A portion of the product is purified by dissolving it in ethanol and precipitating with ether, after which it melts at 180°–181° C. Analysis.—Calculated for $C_{10}H_{13}ClN_2S$: percent C, 52.50; percent H, 5.72; percent S, 14.01. Found: percent C, 52.94; percent H, 5.79; percent S, 13.65. This compound is polymorphic. Melting points of 147°–150° C. and 163°–165° C. have also been observed.

Example 2

This example illustrates the preparation of S-(4-vinylbenzyl)thiourea and 4-(mercaptomethyl)styrene.

Two hundred twenty-nine grams of S-(4-vinylbenzyl)-isothiouronium chloride is dissolved in water to make an approximately 10% solution. A small excess of ammonia over that required to convert the hydrogen chloride to ammonium chloride is added, and the slurry of S-(4-vinylbenzyl)isothiourea is filtered. After air-drying for three days, the S-(4-vinylbenzyl)isothiourea is placed in a flask equipped with a Claisen head, and a receiver immersed in Dry Ice. The flask is evacuated to a pressure of 0.8 mm. Hg and heated with an oil bath at 130°–140° C. The 4-(mercaptomethyl)styrene distills at a temperature of about 86° C. in the course of 2 hours. The yield of 4-(mercaptomethyl)styrene is 118.2 g., or 78% of theory, $n_D^{26}=1.6027$. Analysis.— Calculated for $C_9H_{10}S$: percent C, 71.94; percent H, 6.72; percent S, 21.35. Found: percent C, 71.6; percent H, 6.84; percent S, 21.1.

Example 3

This example illustrates the fungicidal activity of S-(4-vinylbenzyl)isothiouronium chloride.

An aqueous suspension of S-(4-vinylbenzyl)isothiouronium chloride at a concentration of 2000 parts per million was sprayed on tomato plants. The thus treated tomato plants, and untreated tomato plants as controls, were sprayed with an aqueous suspension of the spores of tomato early blight fungus (*Alternaria solani*) and held overnight at 75° F. and 100 percent relative humidity to permit spore germination and host infection before removing the plant to the greenhouse. Three days later the lesions were scored on the treated and check plants. The plants treated with the S-(4-vinylbenzyl)-isothiouronium chloride showed 93% control of the blight as compared to the control plants.

Example 4

This example illustrates the prepartion of poly[4-(mercaptomethyl)styrene].

Materials in the proportions of 100 parts of 4-(mercaptomethyl)styrene, 3 parts of palmitic acid, 15 parts of 1-normal aqueous KOH solution, 5 parts of 2% $K_2S_2O_8$ aqueous solution, and 180 parts of water are placed in a 25 x 150 mm. test tube. The tube is swept with nitrogen, sealed and placed in a 50° C. rocking bath for 17 hours. The polymer is latex and prefloc in about equal proportions. It is isolated by pouring the entire mixture into methanol. The resultant, light tan powder is insoluble, both cold and hot, in toluene, xylene, trichloroethylene and methyl ethyl ketone. It is highly swelled, but not dissolved, in hot pyridine, indicating a small amount of cross-linking. It shows a crystalline structure under X-rays, which disappears at 106° C. giving this as the crystalline melting point. The poly[4-(mercaptomethyl)styrene] is molded to a tough, tan-colored amorphous film.

Example 5

This example illustrates the increased branching imparted to styrene polymers by copolymerizing styrene with a minor amount of 4-(mercaptomethyl)styrene.

The ingredients shown in the following table are placed in glass bottles.

| | A | B | C |
|---|---|---|---|
| Styrene, ml | 110 | 110 | 110 |
| 4-(mercaptomethyl)-styrene, g | | 1.4 | 2.9 |
| Tertiary dodecyl mercaptan, g | .15 | .15 | .15 |
| Palmitic acid, g | 3 | 3 | 3 |
| 1-Normal aqueous KOH, ml | 15 | 15 | 15 |
| 2% aqueous $K_2S_2O_8$, ml | 5 | 5 | 5 |
| Water, ml | 180 | 180 | 180 |

The air is displaced by nitrogen, and the bottles are sealed. The bottles are shaken in a 50° C. water bath for 17 hours, after which the bottles are opened and the unreacted styrene removed by steam distillation. The cooled residues are poured into sufficient methanol to precipitate the solid polymers which are then filtered off, washed with methanol and dried at 50° C. in a circulating air oven. The conversions are 95% to 97%.

The polymers A, B and C are shaped by heat and pressure, by placing in a compression mold and heating for 3 minutes to 160° C., thereafter cooling to room temperature and removing the shaped piece.

The Huggins K' value (M. L. Huggins, J. Am. Chem. Soc., 64, 2716, 1942) for polymers A, B and C is 0.34, 0.57 and 0.60 respectively. Angier et al., J. Polymer Sci., 25, 129 (1957), state that values of K' in the Huggins equation give a qualitative measure of branching; the higher the K' value, the more the branching. Comparison of the K' values of polymers B and C with the K' value of polymer A shows that a more highly branched polymer, i.e., a more easily processible polymer, is formed when it contains 4-(mercaptomethyl)styrene.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A compound selected from the group consisting of S-(4-vinylbenzyl)isothiouronium chloride and S-(4-vinylbenzyl)isothiourea.
2. S-(4-vinylbenzyl)isothiouronium chloride.
3. S-(4-vinylbenzyl)isothiourea.

References Cited by the Examiner

UNITED STATES PATENTS

| | | | |
|---|---|---|---|
| 2,640,079 | 5/1953 | De Venneville | 260—564 |
| 2,947,731 | 4/1957 | Nummy | 260—79.7 |
| 2,894,029 | 7/1959 | Winthrod | 260—564 |
| 3,179,638 | 4/1965 | Shashoua | 260—79.7 |

CHARLES B. PARKER, *Primary Examiner.*

JOSEPH L. SCHOFER, *Examiner.*

J. F. McNALLY, R. V. HINES, *Assistant Examiners.*

Notice of Adverse Decision in Interference

In Interference No. 96,407 involving Patent No. 3,260,748, S. J. Nelson, Jr., S-(4-VINYLBENZYL)-ISOTHIOUREA AND ISOTHIOURONIUM CHLORIDE, final judgment adverse to the patentee was rendered Aug. 28, 1970, as to claim 2.

[*Official Gazette November 17, 1970.*]